(12) United States Patent
Sawada

(10) Patent No.: US 11,997,244 B2
(45) Date of Patent: May 28, 2024

(54) IMAGE PROCESSING APPARATUS, IMAGE PROCESSING SYSTEM, IMAGE PROCESSING METHOD, AND NON-TRANSITORY RECORDING MEDIUM CONFIGURED TO CALIBRATE A COLOR DENSITY

(71) Applicant: Takuroh Sawada, Kanagawa (JP)

(72) Inventor: Takuroh Sawada, Kanagawa (JP)

(73) Assignee: Ricoh Company, Ltd.

( * ) Notice: Subject to any disclaimer, the term of this patent is extended or adjusted under 35 U.S.C. 154(b) by 0 days.

(21) Appl. No.: 17/962,893

(22) Filed: Oct. 10, 2022

(65) Prior Publication Data
US 2023/0171365 A1 Jun. 1, 2023

(30) Foreign Application Priority Data
Nov. 26, 2021 (JP) .................................. 2021-192557

(51) Int. Cl.
*H04N 1/60* (2006.01)
*G01J 3/52* (2006.01)

(52) U.S. Cl.
CPC .............. *H04N 1/6033* (2013.01); *G01J 3/52* (2013.01)

(58) Field of Classification Search
CPC .............. H04N 1/6033; H04N 1/6002; H04N 1/00045; G01J 3/52
USPC ................... 358/1.9, 504, 518, 521; 382/167
See application file for complete search history.

(56) References Cited

U.S. PATENT DOCUMENTS

| 2008/0144060 A1* | 6/2008 | Ishikawa .............. H04N 1/4078 358/1.9 |
| 2011/0292417 A1 | 12/2011 | Miyagi |
| 2015/0168901 A1* | 6/2015 | Yasuda .................. G03G 15/55 399/72 |
| 2021/0329144 A1 | 10/2021 | Matsushima et al. |

FOREIGN PATENT DOCUMENTS

| JP | 2010-263345 | 11/2010 |
| JP | 2012-015993 | 1/2012 |
| JP | 2014-116721 | 6/2014 |

* cited by examiner

*Primary Examiner* — Jamares Q Washington
(74) *Attorney, Agent, or Firm* — Harness, Dickey & Pierce, P.L.C.

(57) ABSTRACT

An image processing apparatus includes circuitry that acquires a colorimetric value for each of a plurality of patches on a first chart printed out by an image forming apparatus and read by a colorimeter. Each of the patches has a monochromatic color. The circuitry further acquires a maximum tone value previously set in accordance with a sheet, and converts each of the colorimetric value, the maximum tone value, and a color system value of a first target into a particular color value. The first target represents an ideal characteristic of the color system value corresponding to a tone value. The circuitry further determines, as a second target, a characteristic passing through a point determined by a color value corresponding to the maximum tone value. The characteristic is generated based on the color system value of the first target converted into the particular color value.

17 Claims, 10 Drawing Sheets

IMAGE PROCESSING APPARATUS, IMAGE PROCESSING SYSTEM, IMAGE PROCESSING METHOD, AND NON-TRANSITORY RECORDING MEDIUM CONFIGURED TO CALIBRATE A COLOR DENSITY

CROSS-REFERENCE TO RELATED APPLICATION

This patent application is based on and claims priority pursuant to 35 U.S.C. § 119(a) to Japanese Patent Application No. 2021-192557, filed on Nov. 26, 2021, in the Japan Patent Office, the entire disclosure of which is hereby incorporated by reference herein.

BACKGROUND

Technical Field

Embodiments of this disclosure relate to an image processing apparatus, an image processing system, an image processing method, and a non-transitory recording medium.

Related Art

In recent years, an electrophotographic, thermal, or inkjet image forming apparatus has been widely used as a digital color copier or a color printer, for example. The image density of a printed material printed by such an image forming apparatus may fluctuate owing to an environmental change such as a change in temperature or humidity or a change over time of a component of the image forming apparatus. Further, the image density of the printed material may vary because of slight variations between components of the image forming apparatus existing before the shipment of the image forming apparatus. To address the change in the image density, a process called calibration is typically executed before the use of the image forming apparatus to adjust a color conversion table to target output characteristics.

Specifically, a typical calibration method prints out a reference chart from the image forming apparatus, reads a printed material of the reference chart with a scanner, and performs colorimetry on the printed material of the reference chart with a colorimeter to analyze the output characteristics of the image forming apparatus. The method then corrects the color conversion table to obtain the target output characteristics of process colors: cyan (C), magenta (M), yellow (Y), and black (K).

As an example of the above-described technique for the calibration of a monochromatic color, if the actual image density of the image forming apparatus is deviated from the ideal output characteristic owing to the fluctuation, a tone correction table for reducing the density to offset the fluctuation is generated as well as the use of a target output density table. The above-described calibration, however, is based on the density and is not applicable to a color other than the process colors.

SUMMARY

In one embodiment of this invention, there is provided an image processing apparatus that includes, for example, circuitry that acquires a colorimetric value for each of a plurality of patches on a first chart printed out by an image forming apparatus and read by a colorimeter. Each of the plurality of patches has a monochromatic color. The circuitry further acquires a maximum tone value previously set in accordance with a sheet, and converts each of the colorimetric value, the maximum tone value, and a color system value of a first target into a particular color value. The first target represents an ideal characteristic of the color system value corresponding to a tone value. The circuitry further determines, as a second target, a characteristic passing through a point determined by a color value corresponding to the maximum tone value. The characteristic is generated based on the color system value of the first target converted into the particular color value.

In one embodiment of this invention, there is provided an image processing system that includes, for example, the above-described image processing apparatus, a colorimeter that reads the first chart, and an image forming apparatus that uses correction information created by the image processing apparatus with the second target.

In one embodiment of this invention, there is provided an image processing method that includes, for example, acquiring a colorimetric value for each of a plurality of patches on a first chart read by a colorimeter. Each of the plurality of patches has a monochromatic color. The image processing method further includes acquiring a maximum tone value previously set in accordance with a sheet, and converting each of the colorimetric value, the maximum tone value, and a color system value of a first target into a particular color value. The first target represents an ideal characteristic of the color system value corresponding to a tone value. The image processing method further includes determining, as a second target, a characteristic passing through a point determined by a color value corresponding to the maximum tone value. The characteristic is generated based on the color system value of the first target converted into the particular color value.

In one embodiment of this invention, there is provided a non-transitory recording medium which, when executed by one or more processors, cause the processors to perform the above-described image processing method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
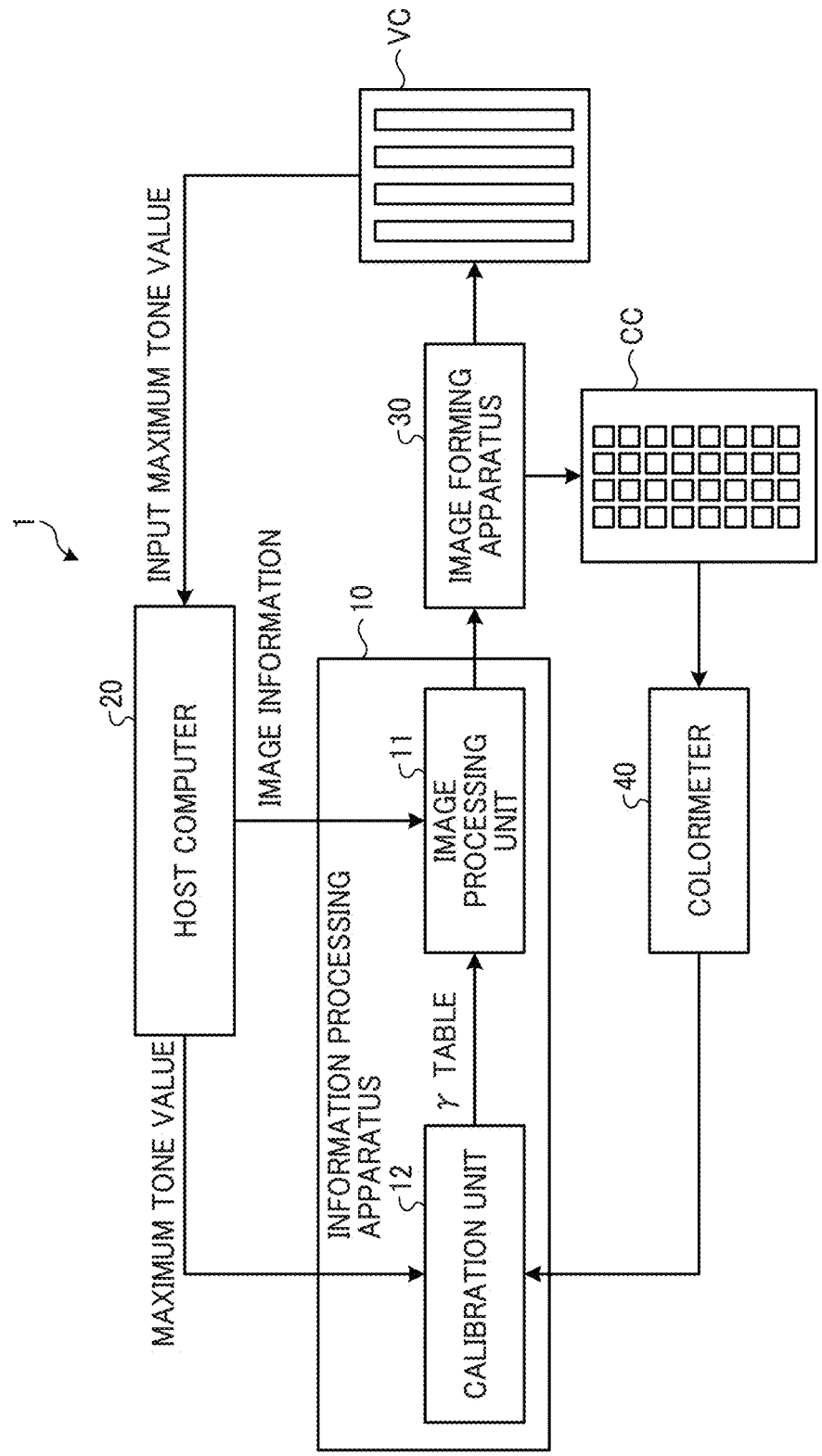
FIG. 1 is a diagram illustrating an example of the general arrangement of an information processing system according to an embodiment of the present invention.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In the market, an image forming apparatus for advanced printing is distributed in the market to print in a subtle color tone or in a color gamut unreproducible with the process colors. Such an image forming apparatus adds toner of a special color, such as green or orange, to toner of the process colors. The density corresponding to the tone value is defined for each of the process colors by the Commission Internationale de l'Eclairage (CIE), but is not defined for a color other than the process colors. Therefore, the target value (hereinafter simply referred to as the target) is not specified for the tone value of the special color, leaving it open how to determine the target and perform calibration for the special color.

To calibrate the above-described color other than the process colors, color correction may be performed on a color created by mixing two colors, for example. In this case, to prevent the influence of a color other than the two colors, there is a technique of generating the target, i.e., the ideal density characteristic corresponding to the tone value, by connecting, with a straight line, a plurality of values from the value of a white color of the sheet (a paper white value) to the value corresponding to the maximum tone value of colorimetry data (a solid color value). This technique generates the target by connecting the values from the paper white value to the solid color value, enabling the target to be set for the toner of any color. That is, the technique enables the calibration on a color other than the process colors. The technique is also applicable to a case in which the maximum tone value is set to a desired value.

According to the above-described technique, which generates the target with the straight line, a portion of the target between a highlight (low tone) area and a halftone (middle tone) area is also expressed by the straight line. In consideration of the sensitivity of human visual perception to the change in tone in the highlight-to-halftone range, however, the change in tone in the highlight-to-halftone range is not sharp enough in the target expressed by the straight line, resulting in poor color reproduction near the highlight area. In an inkjet image forming apparatus, for example, the target in a substantially linear shape does not significantly affect the color reproduction quality on a sheet with a wide color gamut (e.g., a coated sheet). On a sheet with a narrow color gamut (e.g., a matte sheet), however, the target in the substantially linear shape affects the color reproduction quality. That is, the typical calibration technique has difficulty in responding to different types of sheets with different print characteristics (e.g., different image densities on the printed material) while ensuring the tone reproducibility in the highlight-to-halftone range.

In view of the above, it is desirable to improve the responsiveness to a variety of sheets with different print characteristics while ensuring the tone reproducibility.

With reference to the drawings, detailed description will be given of embodiments of an image processing apparatus, an image processing system, an image processing method, and a program-recorded recording medium of the present invention.

A general arrangement of an information processing system 1 according to an embodiment of the present invention will first be described with reference to FIG. 1.

FIG. 1 a diagram illustrating an example of the general arrangement of the information processing system 1 of the present embodiment. As illustrated in FIG. 1, the information processing system 1 (an image processing system) includes an information processing apparatus 10, a host computer 20, an image forming apparatus 30, and a colorimeter 40.

The information processing apparatus 10 is an image processing apparatus that receives image information from the host computer 20, performs particular image processing on the image information to generate image data in a format printable by the image forming apparatus 30, and transmits the image data to the image forming apparatus 30. The information processing apparatus 10 may be an information processing apparatus such as a typical personal computer (PC), a controller dedicated to the image forming apparatus 30, or a controller included in the image forming apparatus 30, for example. As illustrated in FIG. 1, the information processing apparatus 10 includes an image processing unit 11 and a calibration unit 12, which are implemented by a central processing unit (CPU) 501 in FIG. 2, for example.

The image processing unit 11 is a functional unit that performs the particular image processing on the image information received from the host computer 20 with calibration data (e.g., a γ table) created by the calibration unit 12.

The calibration unit 12 is a functional unit that performs a calibration process. Specifically, with a maximum tone value input to the host computer 20 based on a visual check chart VC printed out from the image forming apparatus 30 and a colorimetric value of a calibration chart CC printed out from the image forming apparatus 30, the calibration unit 12 performs the calibration process to create the γ table. The calibration unit 12 transmits the created γ table to the image processing unit 11.

The host computer 20 is an information processing apparatus, such as a PC, which in response to reception of an instruction to execute a printing process from an application running on the host computer 20, runs a printer driver and transmits the image information to be printed to the information processing apparatus 10. The host computer 20 further receives, via an input device such as a mouse or a keyboard, parameters for use in a process such as the calibration process.

The image forming apparatus 30 is, for example, an inkjet color printer that prints out a print based on the image data received from the information processing apparatus 10. The image forming apparatus 30 further prints out the calibration chart CC (a first chart) and the visual check chart VC (a second chart), which are used in the calibration process performed in the information processing apparatus 10. In this case, the image information of the calibration chart CC and the visual check chart VC may be stored in the host computer 20, for example.

In the above-described example, the calibration process is performed with the maximum tone value input by a user (e.g., an administrator) with the input device based on the visual check chart VC printed out from the image forming apparatus 30. The input of the maximum tone value, however, is not limited to this example. For instance, during the calibration process by the calibration unit 12, a display of the host computer 20 may display the image of the visual check chart VC, and the user may input the maximum tone value by checking the displayed image. Alternatively, during the calibration process by the calibration unit 12, the display of the host computer 20 may display the colorimetric value of the calibration chart CC obtained through the colorimetry by the colorimeter 40, and the user may input the maximum tone value by checking the colorimetric value.

In the example of FIG. 1, the colorimeter 40 is illustrated as an apparatus separate from the image forming apparatus 30. The colorimeter 40, however, may be included in a reading device such as a scanner, or may be disposed on a sheet transport path in the image forming apparatus 30.

The colorimeter 40 is an apparatus, such as a spectral reflectometer, which performs the reading (i.e., colorimetry) on a color patch included in the calibration chart CC printed out by the image forming apparatus 30, to thereby obtain the colorimetric value. The colorimetric value is represented by the L*a*b* values, which are the color values in the L*a*b* color system, or by tristimulus values XYZ, for example.

The information processing apparatus 10, the host computer 20, the image forming apparatus 30, and the colorimeter 40 in FIG. 1 may be connected via a network such as a local area network (LAN) to be communicable with each other.

A hardware configuration of the information processing apparatus 10 of the present embodiment will be described with reference to FIG. 2.

Figure 2:
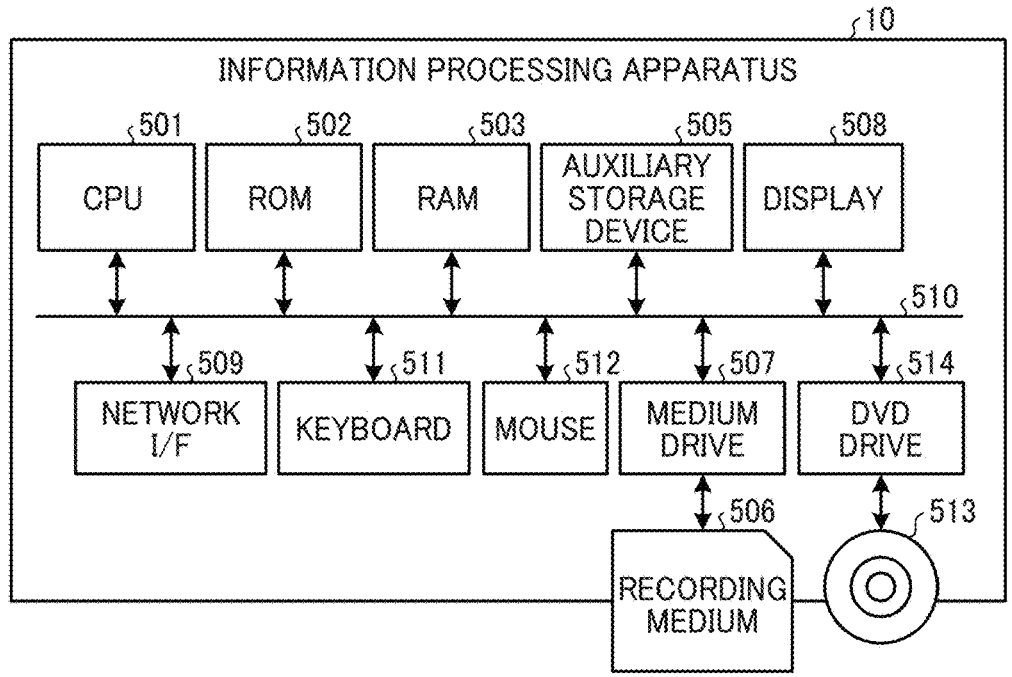
FIG. 2 is a diagram illustrating an example of the hardware configuration of an information processing apparatus included in the information processing system of the embodiment.

FIG. 2 is a diagram illustrating an example of the hardware configuration of the information processing apparatus 10 of the present embodiment. As illustrated in FIG. 2, the information processing apparatus 10 includes the CPU 501, a read only memory (ROM) 502, a random access memory (RAM) 503, an auxiliary storage device 505, a medium drive 507, a display 508, a network interface (I/F) 509, a keyboard 511, a mouse 512, and a digital versatile disc (DVD) drive 514.

The CPU 501 is an arithmetic device that controls overall operation of the information processing apparatus 10. The ROM 502 is a nonvolatile storage device that stores programs such as an initial program loader (IPL) executed first by the CPU 501. The RAM 503 is a volatile storage device used as a work area of the CPU 501.

The auxiliary storage device 505 is a nonvolatile storage device that stores various data of programs, for example. The auxiliary storage device 505 is a hard disk drive (HDD) or a solid state drive (SSD), for example.

The medium drive 507 is a device that controls data writing and reading to and from a recording medium 506 such as a flash memory.

The display 508 is a liquid crystal display (LCD) or organic electroluminescence (EL) display, for example, which displays various information such as a cursor, menus, windows, text, and images.

The network I/F 509 is an interface for performing data communication with another apparatus such as the host computer 20, the image forming apparatus 30, or the colorimeter 40 via the network. For example, the network I/F 509 is a network interface card (NIC) that enables communication in accordance with a protocol such as transmission control protocol/internet protocol (TCP/IP). The network I/F 509 may be a communication interface with a wireless communication function based on a standard such as wireless-fidelity (Wi-Fi®).

The keyboard 511 is an example of an input device including a plurality of keys for inputting text, numerical values, and various instructions, for example. The mouse 512 is an input device used to select and execute various instructions, select a processing target, or move the cursor, for example.

The DVD-RW drive 514 is a device that controls writing and reading of various data to and from a DVD 513 as an example of a removable recording medium. The DVD 513 is a DVD-rewritable (DVD-RW) or a DVD-recordable (DVD-R), for example. The DVD 513 may be replaced by a compact disc-rewritable (CD-RW) or a CD-recordable (CD-R), for example.

The CPU 501, the ROM 502, the RAM 503, the auxiliary storage device 505, the medium drive 507, the display 508, the network I/F 509, the keyboard 511, the mouse 512, and the DVD drive 514 described above are connected by a bus line 510 including address buses and data buses to be communicable with each other.

The hardware configuration of the information processing apparatus 10 illustrated in FIG. 2 is illustrative. The information processing apparatus 10 is not necessarily required to include all of the above-described component devices. Further, the information processing apparatus 10 may include a device other than the above-described ones. For example, if the information processing apparatus 10 does not need to receive input of an operation or display information, the information processing apparatus 10 may not include devices such as the keyboard 511, the mouse 512, and the display 508. The host computer 20 may have a hardware configuration similar to that of FIG. 2.

A configuration and an operation of functional blocks of the image processing unit 11 in the information processing apparatus 10 of the present embodiment will be described with reference to FIG. 3.

Figure 3:
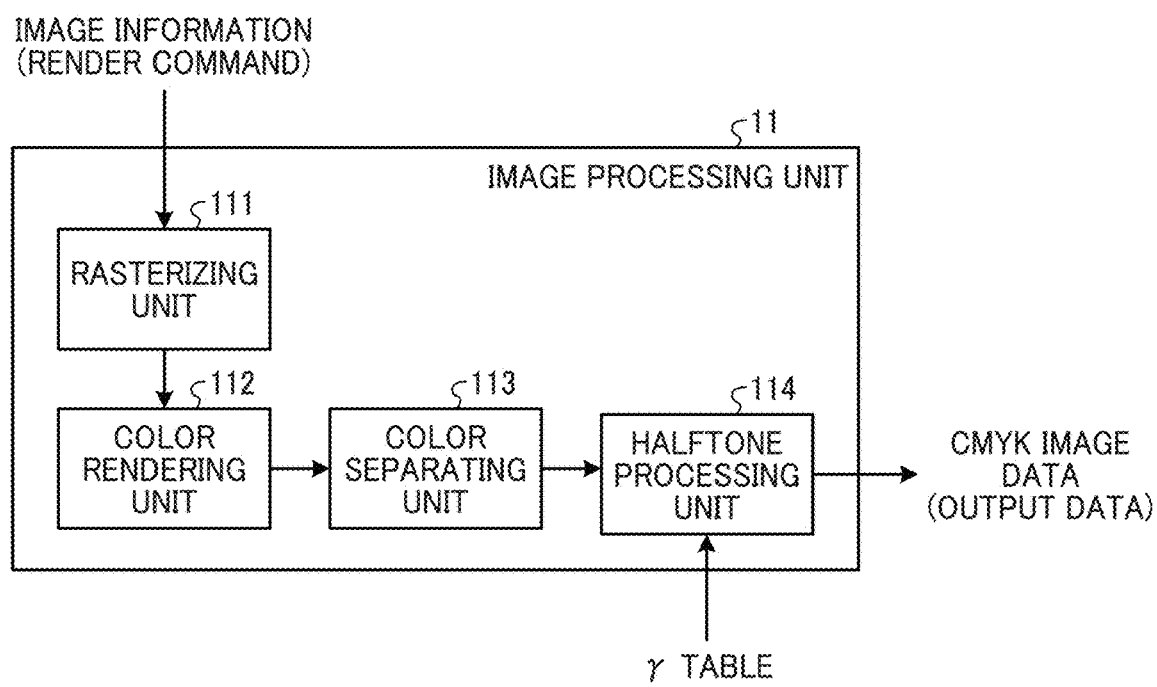
FIG. 3 is a diagram illustrating a configuration example of functional blocks of an image processing unit included in the information processing apparatus of the embodiment.

FIG. 3 is a diagram illustrating a configuration example of the functional blocks of the image processing unit 11 in the information processing apparatus 10 of the present embodiment. As illustrated in FIG. 3, the image processing unit 11 of the information processing apparatus 10 includes a rasterizing unit 111, a color rendering unit 112, a color separating unit 113, and a halftone processing unit 114.

The rasterizing unit 111 is a functional unit that converts the image information received from the host computer 20, which is data in a render command format formed with red (R), green (G), and blue (B) color signals for display, into 8-bit bitmap data for each of the RGB colors by interpreting the render command. The rasterizing unit 111 transmits the converted 8-bit bitmap data of the RGB colors to the color rendering unit 112.

The color rendering unit 112 is a functional unit that converts the 8-bit bitmap data of the RGB colors received from the rasterizing unit 111 into 8-bit R'G'B' data through color gamut compression with a profile associated with a corresponding device to fit the color gamut of the image forming apparatus 30. This data conversion addresses the difference in the color gamut and the color reproduction characteristic between the display and the image forming apparatus 30. The color rendering unit 112 transmits the converted 8-bit R'G'B' data to the color separating unit 113.

The color separating unit 113 is a functional unit that performs a color separation process called under color removal (UCR) or under color addition (UCA) on the 8-bit R'G'B' data received from the color rendering unit 112 to separate the 8-bit R'G'B' data into 8-bit cyan (C), magenta (M), yellow (Y), and black (K) image data. It is assumed here that the image forming apparatus 30 uses the four colors CMYK. The color separating unit 113 transmits the obtained 8-bit CMYK image data to the halftone processing unit 114.

The halftone processing unit 114 is a functional unit that converts the 8-bit CMYK image data received from the color separating unit 113 into CMYK image data with a lower bit width (e.g., 3-bit) compatible with the image forming apparatus 30. The halftone processing unit 114 applies the γ table generated by the calibration processing unit 12 to each of the CMYK colors and then converts the 8-bit CMYK image data into the CMYK image data compatible with the image forming apparatus 30. The γ table represents tone input-output characteristics (i.e., color conversion characteristics). With this conversion, the calibration is performed.

The rasterizing unit 111, the color rendering unit 112, the color separating unit 113, and the halftone processing unit 114 of the image processing unit 11 illustrated in FIG. 3 are implemented by the CPU 501 in FIG. 2 executing a program, for example. The rasterizing unit 111, the color rendering unit 112, the color separating unit 113, and the halftone processing unit 114 may be implemented by hardware such as an integrated circuit, or may be implemented by a combination of hardware and software.

The functional units of the image processing unit 11 illustrated in FIG. 3 are conceptual functions, and do not limit the configuration of the image processing unit 11. For example, a plurality of functional units illustrated in FIG. 3 as separate functional units of the image processing unit 11 may be configured as a single functional unit. Further, the function of one of the functional units of the image processing unit 11 illustrated in FIG. 3 may be divided into a plurality of functions to implement a plurality of functional units.

A configuration and an operation of functional blocks of the calibration unit 12 in the information processing apparatus 10 of the present embodiment will be described with reference to FIGS. 4 to 7.

Figure 4:
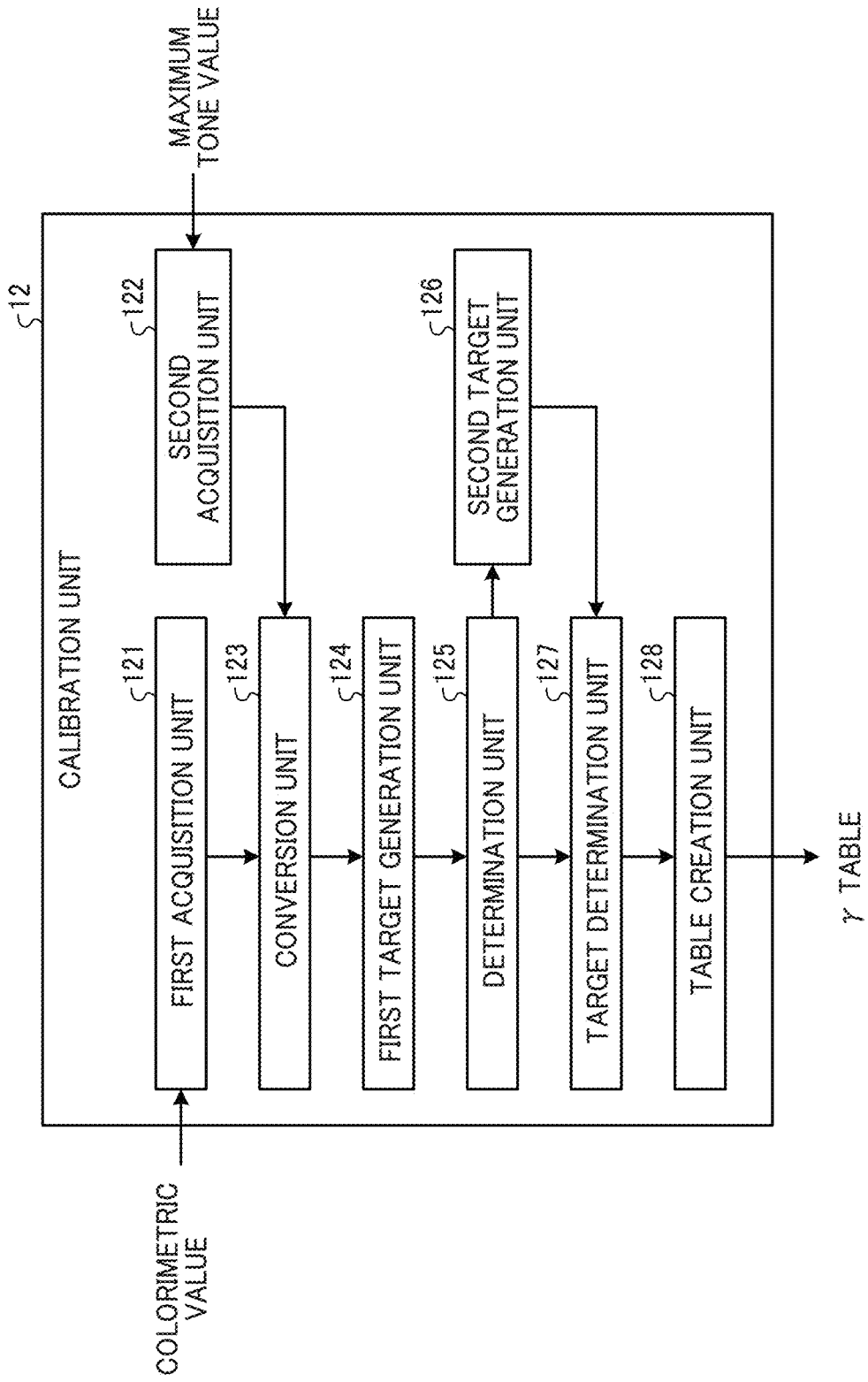
FIG. 4 is a diagram illustrating a configuration example of functional blocks of a calibration unit included in the information processing apparatus of the embodiment.
Figure 5:
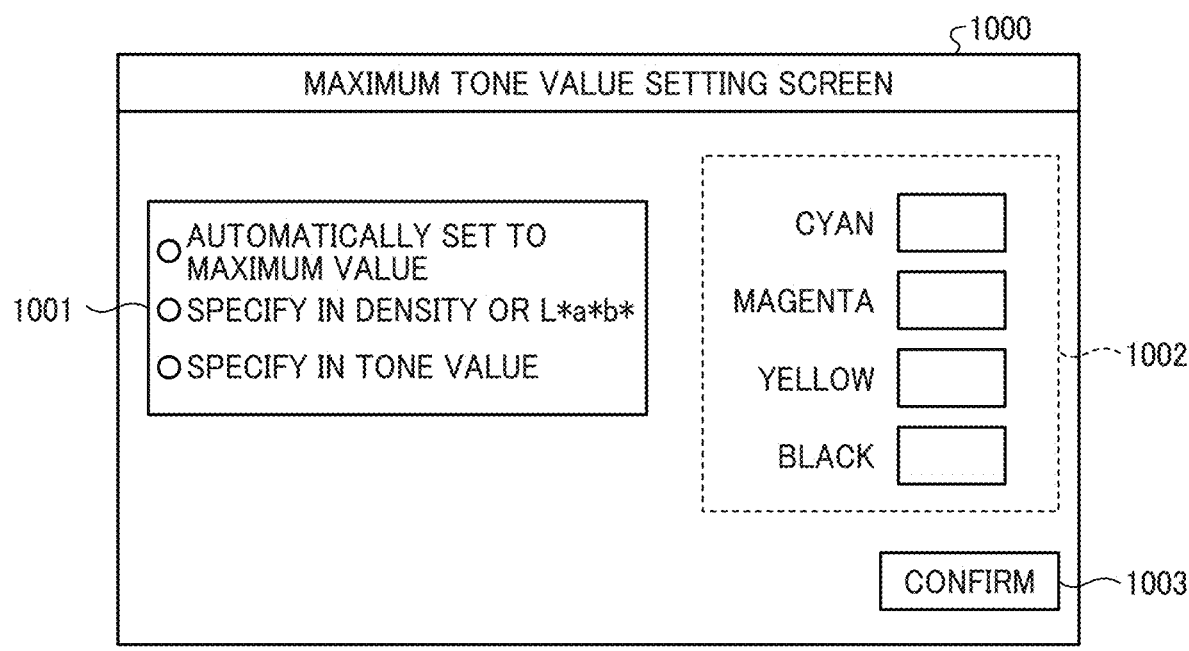
FIG. 5 is a diagram illustrating an example of a maximum tone value setting screen of the embodiment.
Figure 6A:
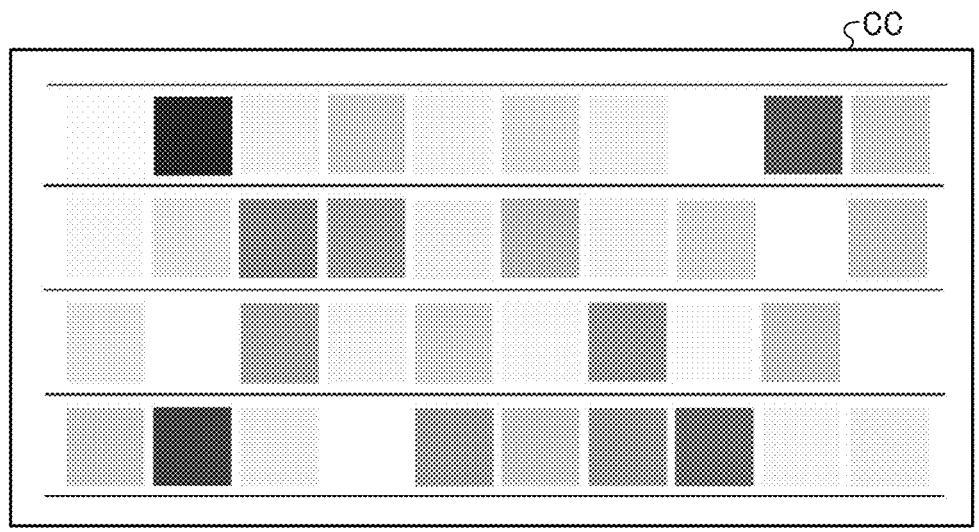
FIG. 6A and FIG. 6B (FIG. 6) are diagrams illustrating examples of a calibration chart of the embodiment.
Figure 6B:
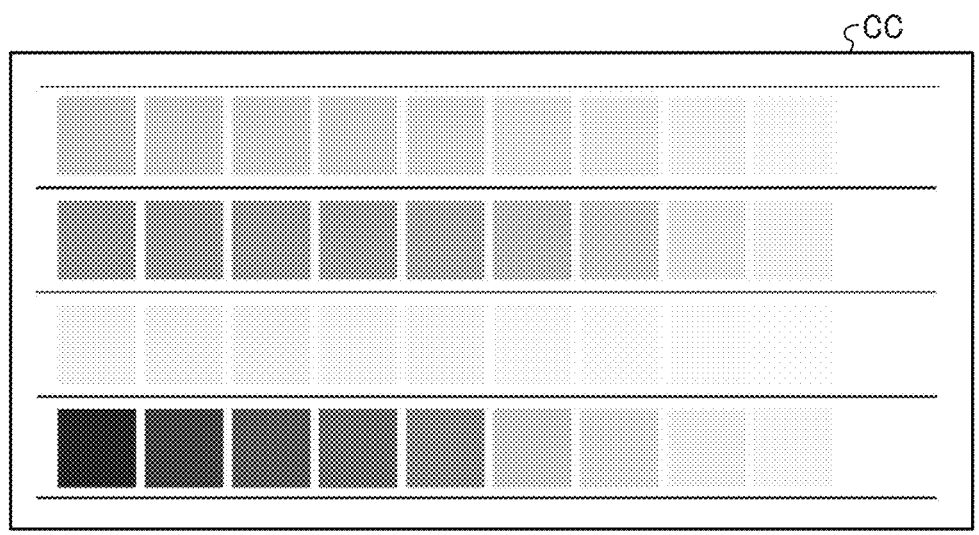
Figure 7:
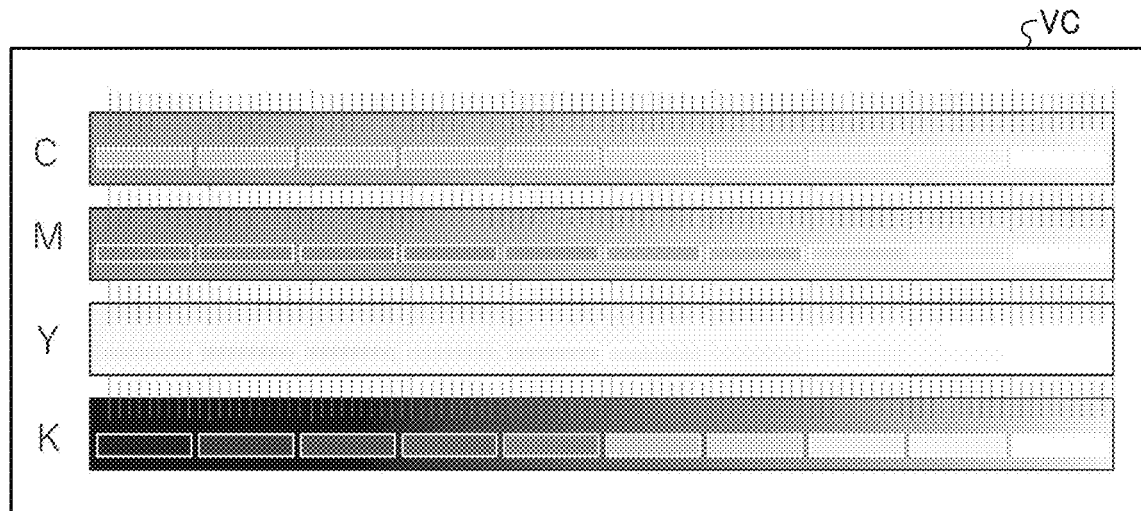
FIG. 7 is a diagram illustrating an example of a visual check chart of the embodiment.

FIG. 4 is a diagram illustrating a configuration example of the functional blocks of the calibration unit 12 in the information processing apparatus 10 of the present embodiment. FIG. 5 is a diagram illustrating an example of a maximum tone value setting screen of the present embodiment. FIG. 6A and FIG. 6B (FIG. 6) are diagrams illustrating examples of the calibration chart CC. FIG. 7 is a diagram illustrating an example of the visual check chart VC.

As illustrated in FIG. 4, the calibration unit 12 includes a first acquisition unit 121, a second acquisition unit 122, a conversion unit 123, a first target generation unit 124 (a first generation unit), a determination unit 125, a second target generation unit 126 (a second generation unit), a target determination unit 127 (a determination unit), and a table creation unit 128 (a creation unit).

The first acquisition unit 121 is a functional unit that acquires, via the network I/F 509, the colorimetric value obtained through the colorimetry performed on the calibration chart CC by the colorimeter 40.

A description will be given of the calibration chart CC.

The calibration chart CC is a sample chart printed out by the image forming apparatus 30 based on the CMYK-formatted image data and including an array of rectangular areas represented by various tone values (hereinafter referred to as the patches). The patches of the calibration chart CC are printed at a pitch of a particular tone value for each of the CMYK colors, which are the primary colors of the image forming apparatus 30. In the examples of the calibration chart CC illustrated in FIGS. 6A and 6B, the patches in n tones are arranged for each of the monochromatic colors CMYK. Herein, n represents an integer equal to or less than 256. In the examples illustrated in FIGS. 6A and 6B, n is 10. In the calibration chart CC of FIG. 6A, the patches in the respective colors and tones are arranged at random. In the calibration chart CC of FIG. 6B, the patches are arranged in a row in the order of tone for each of the colors. Either one of the calibration chart CC in FIG. 6A and the calibration chart CC in FIG. 6B may be used. To reduce the influence of the glare of an adjacent patch or the white color of the sheet on the colorimetric value, however, the calibration chart CC of FIG. 6A including the randomly arranged patches may be employed. Specifically, multiple copies of the calibration chart CC of FIG. 6A may be printed out, and the mean of colorimetric values may be calculated for each patch of the same color and tone to reduce the influence of the glare of the adjacent patch or the white color of the sheet on the colorimetric value.

The first acquisition unit 121 stores the acquired colorimetric value in the auxiliary storage device 505.

The second acquisition unit 122 is a functional unit that acquires, via the network I/F 509, the maximum tone value input to the host computer 20 by the user (e.g., the administrator) based on the visual check chart VC printed out from the image forming apparatus 30.

A description will be given of the visual chart VC.

As illustrated in FIG. 7, the visual chart VC is a chart printed out by the image forming apparatus 30 based on the CMYK-formatted image data and including, for each of the colors, an area expressed in gradation in a tone range of 0% to 100%. In the example of the visual chart VC in FIG. 7, the gradation areas of the respective colors are marked with graduations to make the tone values recognizable. Part of the gradation areas may be arranged as shifted by 5% for the purpose of comparison. In the example of FIG. 7, the gradation areas of the respective colors have a rectangular shape. The gradation areas of the respective colors, however, are not limited to the rectangular shape, and may have a circular shape.

The user (e.g., the administrator) executing the calibration checks the above-configured visual chart VC and inputs the maximum tone value for each of the process colors (monochromatic colors) on a maximum tone value setting screen 1000 displayed on the display of the host computer 20 (see the display 508 in FIG. 2). As illustrated in FIG. 5, the maximum tone value setting screen 1000 includes a setting method selection field 1001, a maximum value input field 1002, and a confirm button 1003. The setting method selection field 1001 is a field for selecting the method of inputting the maximum tone value. The maximum value input field 1002 is an input field for inputting the maximum tone value for each of the process colors (monochromatic colors).

For example, if "AUTOMATICALLY SET TO MAXIMUM VALUE" is selected in the setting method selection field 1001, the maximum tone value calculated in the host computer 20 is input to the maximum value input field 1002. In this case, if the host computer 20 calculates that the density will be substantially unchanged with a tone value of 90% or higher, 90% is automatically input to the maximum value input field 1002 as the maximum tone value. Alternatively, the maximum tone value with which the toner is output may be input to the maximum value input field 1002. Further, a value corresponding to 80% of the maximum tone value with which the toner is output or a value at which the toner density is saturated, for example, may be automatically input to the maximum value input field 1002.

It is assumed in the following description of the present embodiment that the tone value ranging from 0% to 100% is input to the maximum value input field 1002 as the maximum tone value for each of the colors. In this case, the user visually checks the gradation areas of the respective colors in the visual check chart VC. Then, with reference to the graduations, the user inputs the tone value perceived as the maximum value to the maximum value input field 1002 as the maximum tone value. The tone value perceived as the maximum value in the visual chart VC varies depending on the sheet type of the visual check chart VC. That is, the user inputs the maximum tone value in accordance with the sheet. Consequently, the calibration is performed with the L*a*b* values or later-described tristimulus values XYZ corresponding to a desired maximum tone value, thereby improving the responsiveness to various types of sheets. For example, if the user decides that there is little perceived difference in density in a tone range of 95% to 100% in the gradation of cyan (C), the user inputs 95% as the maximum tone value for cyan (C). In this case, the tone value perceived to correspond to the maximum density (i.e., 95%) is input instead of 100% as the maximum tone value, thereby preventing excessive ink use and thus the undulation of the sheet due to printing with the tone value set to 100%. Preventing the use of excessive ink also reduces costs. If the maximum density value is usable to set the maximum tone value, the density or L*a*b* values may be input.

The confirm button 1003 is a button for confirming the maximum tone value input to the maximum value input field 1002. In response to pressing of the confirm button 1003, the host computer 20 transmits to the information processing apparatus 10 the maximum tone value of each of the colors input to the maximum value input field 1002. Then, the second acquisition unit 122 of the information processing apparatus 10 acquires, via the network I/F 509, the maximum tone value of each of the colors transmitted from the host computer 20, and stores the acquired maximum tone value of each of the colors in the auxiliary storage device 505.

The conversion unit 123 is a functional unit that converts each of the colorimetric value acquired by the first acquisition unit 121, the maximum tone value acquired by the second acquisition unit 122, and a color system value in an original target (a first target) into a later-described L*a*b* distance to be used in the calibration process. Herein, the original target refers to the ideal density characteristic corresponding to the tone value. The original target is assumed to be previously stored in the auxiliary storage device 505. The original target may be a characteristic of the color system value corresponding to the tone value, such as the L*a*b* values, the tristimulus values XYZ, or values converted from the L*a*b* values or the tristimulus values XYZ, for example. Further, the original target may be determined in accordance with a printing standard or profile, or may be artificially determined as master data. The original target may be previously stored in the auxiliary storage device 505 or the ROM 502 as table-formatted data in the product shipment of the information processing apparatus 10.

The conversion unit 123 further converts each of the above-described values, i.e., the colorimetric value (i.e., the L*a*b* values), the maximum tone value, and the color system value in the original target, into relative L*a*b* values with reference to the white color of the sheet. The relative L*a*b* values refer to the L*a*b* values relative to the white color of the sheet, not to the absolute L*a*b* values obtained through the irradiation using a CIE standard illuminant D50, to prevent the use of ink at the tone value of 0% corresponding to the white color of the sheet. Herein, the absolute L*a*b* values are represented as L_abs, a_abs, and b_abs, and the absolute L*a*b* values of the white color of the sheet are represented as L_0, a_0, and b_0. Further, the relative L*a*b* values are represented as L_ref, a_ref, and b_ref. In this case, the absolute L*a*b* values L_abs, a_abs, and b_abs, the absolute L*a*b* values L_0, a_0, and b_0 of the white color of the sheet, and the relative L*a*b* values L_ref, a_ref, and b_ref in the CIE 1976 (L*, a*, b*) color space are converted into the tristimulus values XYZ in the CIE 1931 XYZ color space as X_abs, Y_abs, and Z_abs, X_0, Y_0, and Z_0, and X_ref, Y_ref, and Z_ref, respectively. The tristimulus values X_ref, Y_ref, and Z_ref are calculated with equation (1) given below.

$$X\_ref = (X\_D50 / X\_0) * X\_abs$$

$$Y\_ref = (Y\_D50 / Y\_0) * Y\_abs$$

$$Z\_ref = (Z\_D50 / Z\_0) * Z\_abs \quad (1)$$

Herein, the tristimulus values X_D50, Y_D50, and Z_D50 are expressed by equation (2) given below.

$$X\_D50 \approx 0.9642$$

$$Y\_D50 \approx 1$$

$$Z\_D50 \approx 0.8249 \quad (2)$$

The tristimulus values X_D50, Y_D50, and Z_D50 in the above equation (2) represent the white point of the CIE standard illuminant D50. Through the conversion into the L*a*b* values with the tristimulus values X_ref, Y_ref, and Z_ref obtained with equation (1) given above, the relative L*a*b* values L_ref, a_ref, and b_ref relative to the white color of the sheet are calculated. The conversion unit 123 thereby converts each of the above-described values, i.e., the colorimetric value (i.e., L*a*b* values), the maximum tone value, and the color system value in the original target into the relative L*a*b* values relative to the white color of the sheet.

The conversion unit 123 further converts the relative L*a*b* values relative to the white color of the sheet as the reference (i.e., the origin) into the L*a*b* distance to be handled as a one-dimensional indicator corresponding to the tone value. When there is data with the L*a*b* values corresponding to the tone value (i.e., the i-th data), the L*a*b* values of the white color of the sheet are defined as L_white, a_white, and b_white, and the L*a*b* values of the i-th data (data other than that of the white color of the sheet) corresponding to the tone value are defined as L_i, a_i, and b_i. In this case, the L*a*b* distance is expressed by equation (3) given below.

$$L*a*b* \text{ distance } (i) = \sqrt{\{(L\_i-L\_white)^2 + (a\_i-a\_white)^2 + (b\_i-b\_white)^2\}} \quad (3)$$

With the above equation (3), the conversion unit 123 converts the relative L*a*b* values of each of the colorimetric value, the maximum tone value, and the color system value in the original target into the L*a*b* distance.

To calculate the L*a*b* distance, the conversion unit 123 may perform linear interpolation as the interpolation of the L*a*b* distance in a discrete chart or the L*a*b* distance in the original target. The conversion unit 123 may further perform a process of removing outliers caused by colorimetry error, for example, with a moving average process or threshold determination. In the interpolation, the conversion unit 123 may perform spline linear interpolation, for example, to have a function Y=f(X) where X represents the tone value of a patch in the calibration chart CC and Y represents the L*a*b* distance corresponding to the tone value X. In the above-described example, each of the colorimetric value, the maximum tone value, and the color system value in the original target is converted into the L*a*b* distance by the conversion unit 123. Each of the colorimetric value, the maximum tone value, and the color system value in the original target, however, is not necessarily required to be converted into the L*a*b* distance, and may be converted into a color value of a particular color system different from the L*a*b* distance.

The first target generation unit 124 is a functional unit that generates a working target F'(x) (a third target) from the L*a*b* distances of the maximum tone value and the color system value in the original target converted by the conversion unit 123. Herein, x represents the tone value, and F'(x) represents the L*a*b* distance calculated from the tone value x. For example, the first target generation unit 124 generates the working target F'(x) represented by equations (4) and (5) given below, in which E(x) represents the original target, IL represents the L*a*b* distance corresponding to the maximum tone value, and Ca represents the tone value of a connection point.

$$F'(x) = E(x) + (IL - E(100))\{(x - Ca)/(100 - Ca)\}^2 \quad (4)$$

$$F'(x) = E(x) \quad (5)$$

Figure 10:
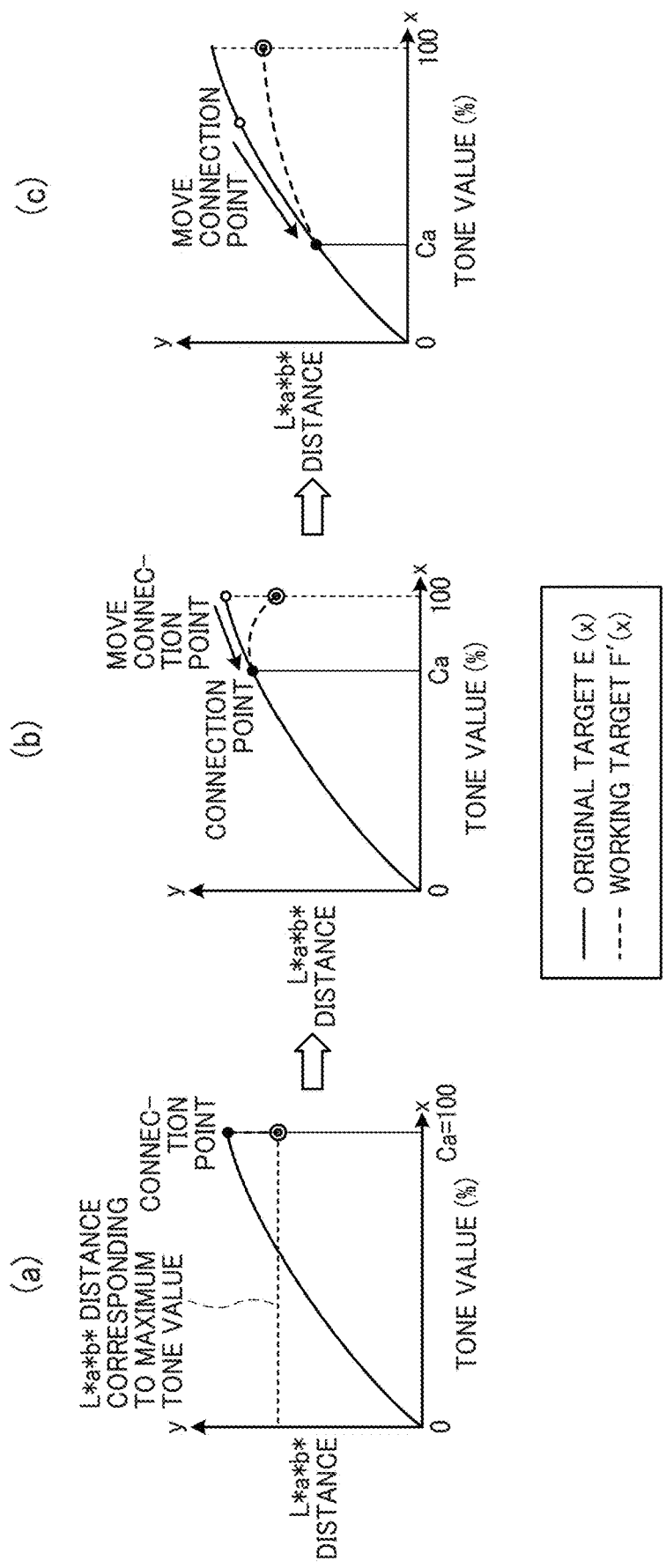
FIG. 10 is a diagram illustrating a new target generation process performed in the information processing apparatus of the embodiment.

Equation (4) applies where the tone value x is greater than the tone value Ca of the connection point (i.e., x>Ca), and equation (5) applies where the tone value x is equal to or less than the tone value Ca of the connection point (i.e., x≤Ca). Herein, the connection point refers to a point moving on the original target E(x) and connecting a portion of the graph of the working target F'(x) expressed by equation (4) and a portion of the graph of the working target F'(x) expressed by equation (5), as illustrated in FIG. 10, which will be described later. The working target F'(x) therefore is a function passing through the connection point and the L*a*b* distance corresponding to the maximum tone value of each of the colors set based on the visual check chart VC. In the graph of the working target F'(x), the portion expressed by equation (4) and the portion expressed by equation (5) are continuously connected to each other at the connection point.

It is desirable that the working target F'(x) generated by the first target generation unit 124 matches as much as possible the original target E(x). As described above, however, the maximum tone value is set by the user; the L*a*b* distance corresponding to the maximum tone value is previously determined, making it difficult to generate the working target F'(x) to exactly match the original target E(x). The first target generation unit 124 therefore seeks the working target F'(x) that meets a first condition and a second condition described below on the original target E(x). The first condition is that the working target F'(x) includes a portion following the original target E(x). The second condition is that a portion of the working target F'(x) not following the original target E(x) is gradational.

Herein, gradational refers to a characteristic of continuous and monotonic increase in the L*a*b* distance with the increase in the tone value, and represents a concept including the saturated state of the L*a*b* distance (an example of the color value). More specifically, it is desirable in the present embodiment that gradational does not mean a sharp change or extreme saturation of the L*a*b* distance with the increase in the tone value. For example, if 256 patches corresponding to tone values 0% to 100% are prepared, the color difference (e.g., ΔE76) between adjacent patches is desirably less than 0.1. Being expressed as the distance from the value of the white color of the sheet in the L*a*b* color space, the L*a*b* distance increases with the increase in the tone value in the gradation (or continuity) of the color value. However, there is a limit to the increase per unit tone value. For example, the increase per unit tone value is limited to 0.1 per unit tone value of 1%. When the working target F'(x) is generated with the above-described equations (4) and (5), the working target F'(x) includes a portion following the original target E(x), as expressed by equation (5), thereby meeting the first condition. The first condition may be that the tone value is equal to or higher than a particular tone value in the portion of the working target F'(x) following the original target E(x). In this case, the working target F'(x) may fail to meet the first condition, depending on the position of the connection point.

The determination unit 125 is a functional unit that determines whether the working target F'(x) meets both the first condition and the second condition when the above-described connection point is moved on the original target E(x).

The second target generation unit 126 is a functional unit that generates a new target G(x) (a fourth target) expressed by equation (6) given below when the determination unit 125 determines that the working target F'(x) does not meet both the first condition and the second condition when the connection point is moved on the original target E(x).

$$G(x) = F''(x)/F''(100)*IL \quad (6)$$

Herein, F''(x) represents the working target F'(x) with the connection point located near the coordinate x=0 (i.e., the tone value x is near 0). The new target G(x) is therefore generated based on the ratio of the target F''(x). The new target G(x) is obtained by normalizing the target F''(x) and multiplying the result by a variable. As described above, the target F''(x) corresponds to the working target F'(x) with the connection point located near the coordinate x=0, and preferably meets the second condition of monotonic increase. The target F''(x) may be calculated by any method. For example, the target F''(x) may be calculated in advance by performing iteration on the L*a*b* distance IL to find the maximum value of the L*a*b* distance IL for realizing the working target F'(x).

The target determination unit 127 is a functional unit that determines a new target (a second target) based on the determination of the determination unit 125. Specifically, if the determination unit 125 determines that the working target F'(x) meets both the first condition and the second condition, the target determination unit 127 determines the working target F'(x) as a new target F(x). If the determination unit 125 determines that the working target F'(x) does not meet both the first condition and the second condition, on the other hand, the target determination unit 127 determines the target G(x) generated by the second target generation unit 126 as a new target.

The table creation unit 128 is a functional unit that creates the γ table with the new target determined by the target determination unit 127. The γ table is represented by a tone reproduction curve (TRC) for correcting the tone value. A specific method of creating the γ table will be described later.

The first acquisition unit 121, the second acquisition unit 122, the conversion unit 123, the first target generation unit 124, the determination unit 125, the second target generation unit 126, the target determination unit 127, and the table creation unit 128 of the calibration unit 12 illustrated in FIG. 4 are implemented by the CPU 501 in FIG. 2 executing a program, for example. The first acquisition unit 121, the second acquisition unit 122, the conversion unit 123, the first target generation unit 124, the determination unit 125, the second target generation unit 126, the target determination unit 127, and the table creation unit 128 may be implemented by hardware such as an integrated circuit, or may be implemented by a combination of hardware and software.

The functional units of the calibration unit 12 illustrated in FIG. 4 are conceptual functions, and do not limit the configuration of the calibration unit 12. For example, a plurality of functional units illustrated in FIG. 4 as separate functional units of the calibration unit 12 may be configured as a single functional unit. Further, the function of one of the functional units of the calibration unit 12 illustrated in FIG. 4 may be divided into a plurality of functions to implement a plurality of functional units.

A sequence of a calibration operation performed in the information processing apparatus 10 of the present embodiment will be described with reference to FIG. 8.

Figure 8:
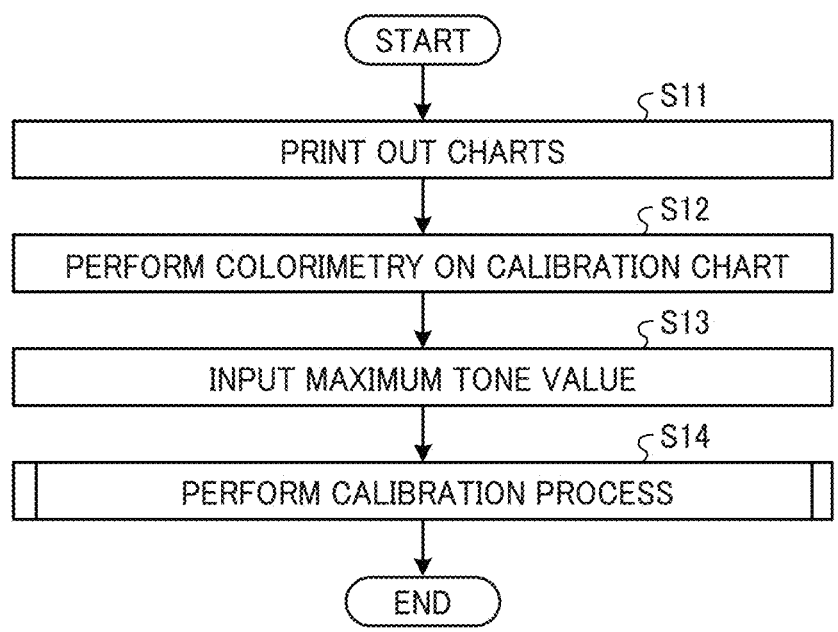
FIG. 8 is a flowchart illustrating an example sequence of a calibration operation performed in the information processing system of the embodiment.

FIG. 8 is a flowchart illustrating an example sequence of the calibration operation performed in the information processing apparatus 10 of the present embodiment.

At step S11, the user operates the host computer 20 to cause, via the information processing apparatus 10, the image forming apparatus 30 to print out the image information of the calibration chart CC and the visual check chart VC stored in the host computer 20.

At step S12, the user sets the calibration chart CC printed out from the image forming apparatus 30 on the colorimeter 40, and causes the colorimeter 40 to perform a reading (i.e., colorimetry) process on the calibration chart CC. The colorimeter 40 transmits to the information processing apparatus 10 the colorimetric values of the patches in the calibration chart CC obtained through the reading of the calibration chart CC. The calibration unit 12 of the information processing apparatus 10 receives the colorimetric values from the colorimeter 40. The calibration operation then proceeds to step S13.

At step S13, the user checks the visual check chart VC printed out from the image forming apparatus 30, and inputs the maximum tone value for each of the process colors (monochromatic colors) on the maximum tone value setting screen 1000 displayed on the display of the host computer 20 (see the display 508 in FIG. 2). Then, the host computer 20 transmits the respective maximum tone values of the process colors input on the maximum tone value setting screen 1000 to the information processing apparatus 10. The calibration operation then proceeds to step S14.

At step S14, the calibration unit 12 of the information processing apparatus 10 performs the calibration process on each of the CMYK colors with the original target E(x), the colorimetric value received from the colorimeter 40, and the maximum tone value received from the host computer 20. After the completion of the calibration process, the calibration unit 12 may notify the host computer 20 of the completion of the calibration process to allow the user to check the notification, for example. Details of the calibration process by the calibration unit 12 will be described later with reference to FIGS. 9 to 12.

A sequence of the calibration process performed by the calibration unit 12 in the information processing apparatus 10 of the present embodiment will be described with reference to FIGS. 9 to 12.

Figure 9:
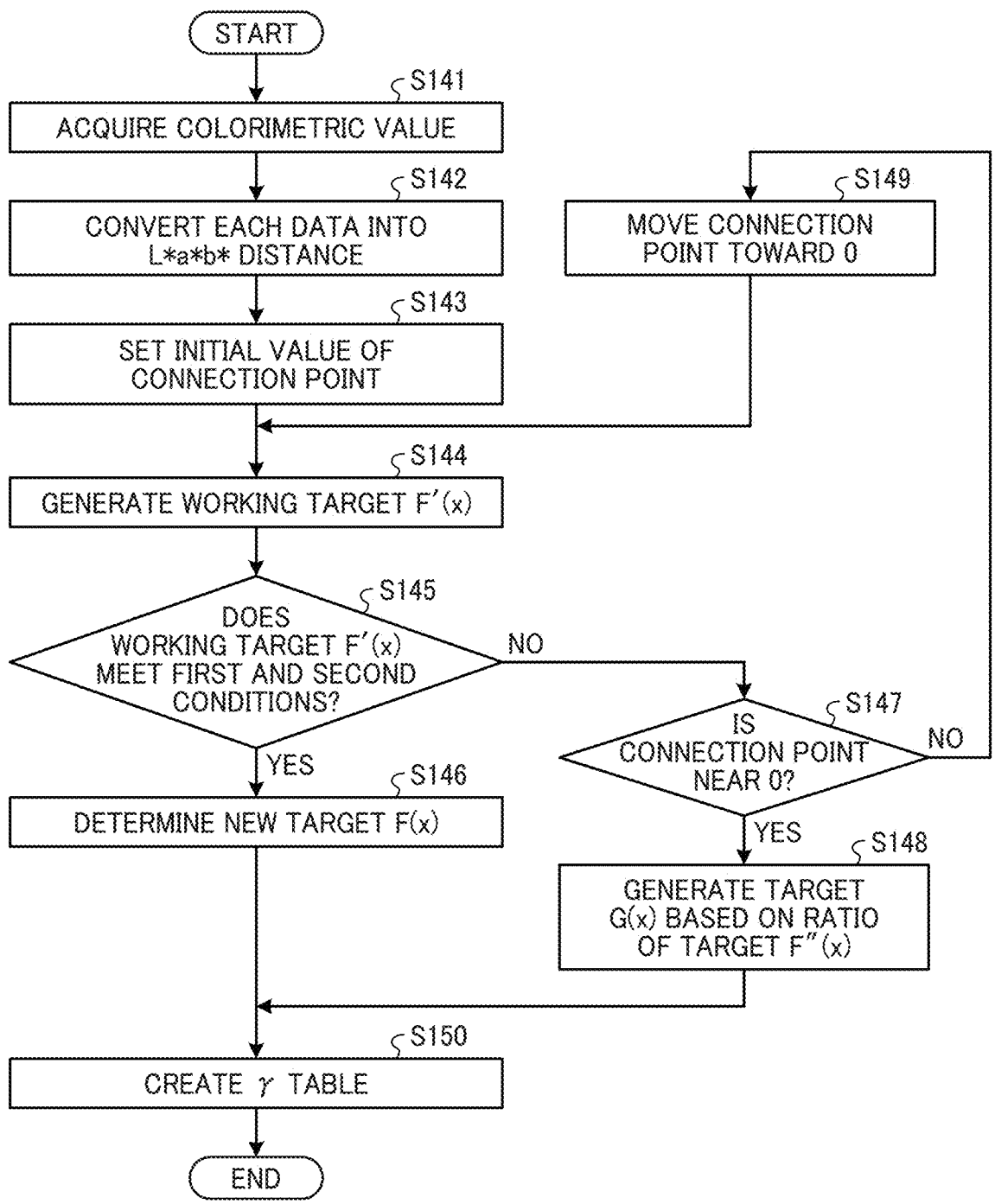
FIG. 9 is a flowchart illustrating an example sequence of a calibration process performed in the information processing apparatus of the embodiment.
Figure 11A:
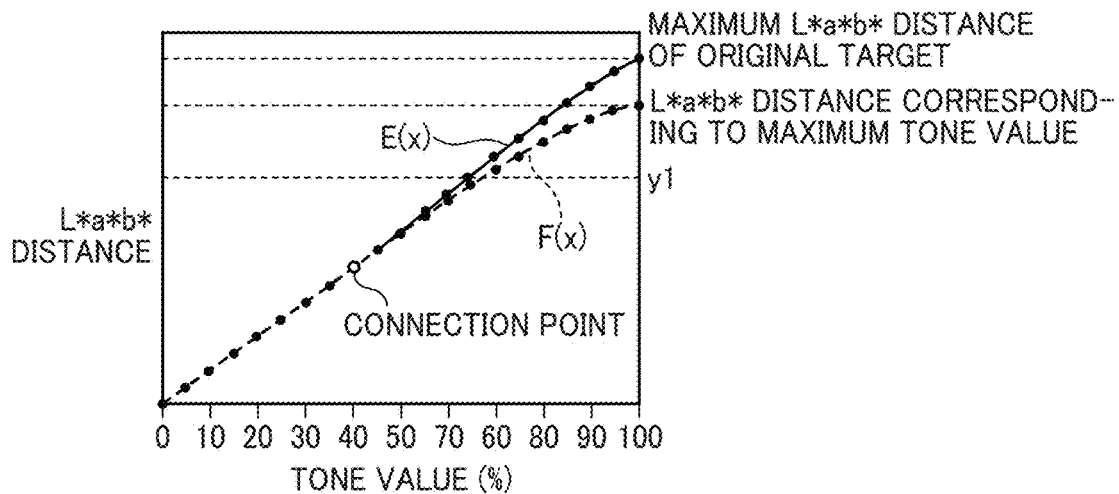
FIG. 11A, FIG. 11B, and FIG. 11C (FIG. 11) are graphs illustrating a boundary where the new target generation method of the embodiment switches.
Figure 11B:
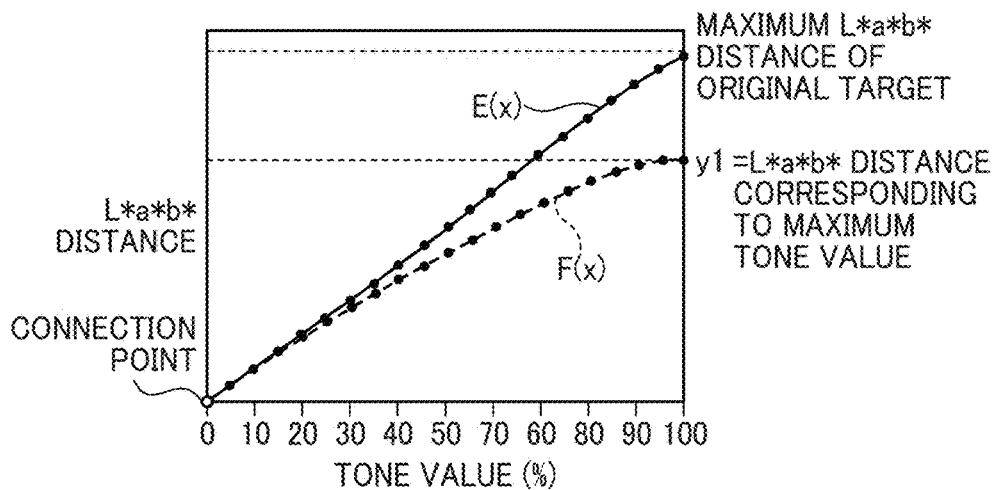
Figure 11C:
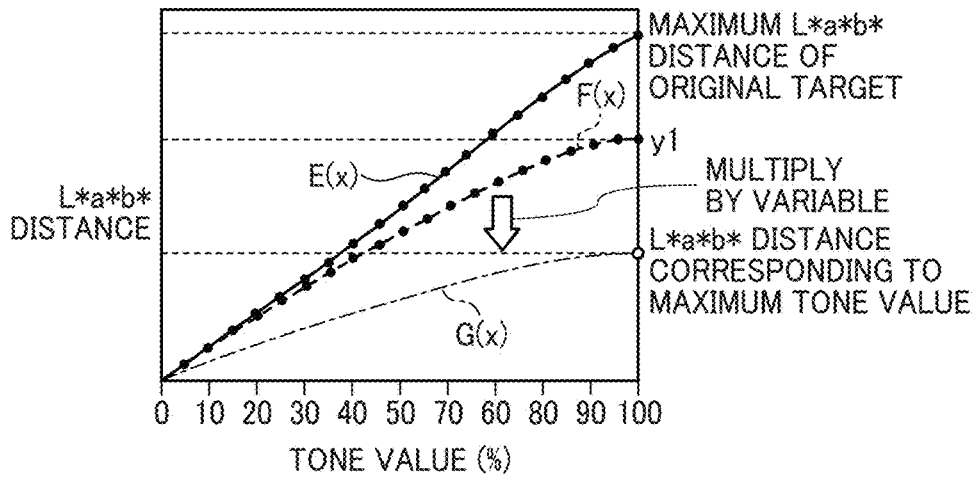
Figure 12:
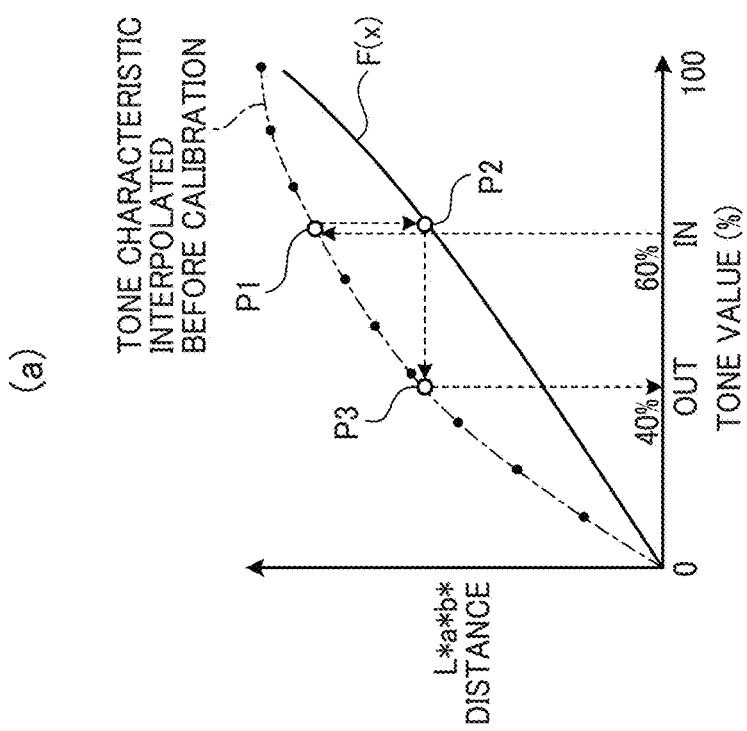
FIG. 12 is a diagram illustrating a γ table creation process performed in the information processing apparatus of the embodiment.

FIG. 9 is a flowchart illustrating an example sequence of the calibration process performed in the information processing apparatus 10 of the present embodiment. FIG. 10 is a diagram illustrating a new target generation process performed in the information processing apparatus 10 of the present embodiment. FIG. 11A, FIG. 11B, and FIG. 11C (FIG. 11) are graphs illustrating a boundary where the new target generation method switches. FIG. 12 is a diagram illustrating a γ table creation process performed in the information processing apparatus 10 of the present embodiment.

At step S141, the first acquisition unit 121 of the calibration unit 12 acquires, via the network I/F 509, the colorimetric values obtained through the colorimetry performed on the calibration chart CC by the colorimeter 40. Further, the second acquisition unit 122 of the calibration unit 12 acquires, via the network I/F 509, the maximum tone values of the respective colors transmitted from the host computer 20. The calibration process then proceeds to step S142.

At step S142, the conversion unit 123 of the calibration unit 12 converts each of the colorimetric values acquired by the first acquisition unit 121, the maximum tone values acquired by the second acquisition unit 122, and the color system values in the original target E(x) into the relative L*a*b* values with reference to the white color of the sheet to use the converted relative L*a*b* values in the calibration process. The conversion unit 123 further converts the relative L*a*b* values into the L*a*b* distance to be handed as a one-dimensional indicator corresponding to the tone value. The calibration process then proceeds to step S143.

At step S143, the first target generation unit 124 of the calibration unit 12 determines the initial value of the tone value Ca of the connection point moving on the original target E(x). In the example illustrated in (a) of FIG. 10, the first target generation unit 124 determines the initial value of the tone value Ca of the connection point on the original target E(x) as 100% (i.e., Ca=100%). The initial of the tone value Ca of the connection point, however, is not limited thereto, and may be set to another value. Further, in the example illustrated in (a) of FIG. 10, the L*a*b* distance corresponding to the maximum tone value is set to be below the L*a*b* distance corresponding to the tone value Ca of the connection point on the original target E(x) (i.e., Ca=100%). The L*a*b* distance corresponding to the maximum tone value, however, is not limited thereto, and may be set to be above the L*a*b* distance corresponding to the tone value Ca of the connection point on the original target E(x). The process described below is also applicable in this case. The calibration process then proceeds to step S144.

At step S144, the first target generation unit 124 generates the working target F'(x) with the above-described equations (4) and (5). The calibration process then proceeds to step S145.

At step S145, the determination unit 125 of the calibration unit 12 determines whether the working target F'(x) generated by the first target generation unit 124 meets both the first condition and the second condition. For example, in an x>Ca portion (i.e., a broken-line portion) of the graph of the working target F'(x) plotted as in (b) of FIG. 10 with the movement of the connection point toward the coordinate x=0 at step S149, the L*a*b* distance is reduced with the increase in the tone value x. In this case, the x>Ca portion is not gradational, failing to meet the second condition. In the determination of whether the working target F'(x) meets the second condition, the determination unit 125 may calculate a slope SL(x)=dF'(x)/dx (e.g., dx≈0.01) for the x>Ca portion of the graph, for example. Then, if the slope SL(x) is not a negative value and is equal to or greater than a threshold value (e.g., 0.1) for the tone value x in the x>Ca portion of the graph, the determination unit 125 may determine that the x>Ca portion is gradational and thus meets the second condition. For example, in the x>Ca portion (i.e., the broken-line portion) of the graph of the working target F'(x) plotted as in (c) of FIG. 10 with the movement of the connection point toward the coordinate x=0 at step S149, the L*a*b* distance increases with the increase in the tone value x. In this case, the increase is monotonic, and thus the x>Ca portion is gradational, meeting the second condition. If the working target F'(x) meets both the first condition and the second condition (YES at step S145), the calibration process proceeds to step S146. If the working target F'(x) does not meet at least one of the first condition or the second condition (NO at step S145), the calibration process proceeds to step S147.

At step S146, based on the determination of the determination unit 125 that the working target F'(x) meets both the first condition and the second condition, the target determination unit 127 of the calibration unit 12 determines the working target F'(x) as the new target F(x). The calibration process then proceeds to step S150.

At step S147, the determination unit 125 determines whether the tone value Ca of the connection point on the original target E(x) is near the coordinate x=0. If the tone value Ca of the connection point is determined to be near the coordinate x=0, the determination unit 125 determines that the connection point is not movable any further toward the coordinate x=0. If the tone value Ca of the connection point is determined to be near the coordinate x=0 (YES at step S147), the calibration process proceeds to step S148. If the tone value Ca of the connection point is determined not to be near the coordinate x=0, i.e., if the connection point is determined to be still movable toward the coordinate x=0 (NO at step S147), the calibration process proceeds to step S149.

At step S148, based on the determination of the determination unit 125 that the tone value Ca of the connection point is near the coordinate x=0, the second target generation unit 126 of the calibration unit 12 generates the target G(x) with the above-described equation (6) based on a determination that the working target F'(x) is not applicable as the new target. Then, the target determination unit 127 of the calibration unit 12 determines the target G(x) generated by the second target generation unit 126 as the new target.

FIG. 11A illustrates the position of the connection point in a case in which the new target F(x) is determined when the maximum tone value is set such that the L*a*b* distance corresponding to the maximum tone value is greater than a particular L*a*b* distance y1. In this state, the connection point is still movable toward the coordinate x=0. FIG. 11B illustrates the position of the connection point in a case in which the new target F(x) is determined when the maximum tone value is set such that the L*a*b* distance corresponding to the maximum tone value is equal to the particular L*a*b* distance y1. In this state, the connection point is located near the coordinate x=0 and is not movable any further toward the coordinate x=0. The particular L*a*b* distance y1 in this case is therefore the maximum L*a*b* distance with which the working target F'(x) is determined as the new target F(x). FIG. 11C illustrates a case in which when the maximum tone value is set such that the L*a*b* distance corresponding to the maximum tone value is less than the particular L*a*b* distance y1, the working target F'(x) is not determined as the new target, and the target G(x) generated with equation (6) based on the ratio of the target F'' is determined as the new target. The calibration process then proceeds to step S150.

At step S149, based on the determination of the determination unit 125 that the tone value Ca of the connection point is not near the coordinate x=0, the first target generation unit 124 moves the connection point toward the coordinate x=0 by a particular distance on the original target E(x). The calibration process then returns to step S144.

At step S150, with the graph obtained through the interpolation of the L*a*b* distance converted from the colorimetric value of the calibration chart CC by the conversion unit 123 (i.e., the graph of the tone characteristic interpolated before the calibration) and the new target determined by the target determination unit 127 (i.e., the new target F(x) in (a) of FIG. 12), the table creation unit 128 of the calibration unit 12 creates the γ table, which is the TRC for correcting the tone value. That is, the table creation unit 128 creates the γ table (an example of correction information) by determining the tone value corresponding to the colorimetric value of the calibration chart CC as an input tone value IN (a first tone value) and calculating an output tone value OUT (a second tone value) corresponding to the input tone value IN. Specifically, as illustrated in (a) of FIG. 12, at the input tone value IN corresponding to the colorimetric value of the calibration chart CC, the L*a*b* distance at a point P1 on the interpolated graph of the tone characteristic is different from the L*a*b* distance at a point P2 on the new target F(x). The table creation unit 128 therefore calculates a point P3 on the interpolated graph of the tone characteristic, i.e., a point at which the L*a*b* distance is equal to the L*a*b* distance at the point P2. The table creation unit 128 then determines the tone value at the point P3 as the output tone value OUT corresponding to the input tone value IN, and performs this association between the output tone value OUT and the input tone value IN in the entire tone range of 0% to 100%. Thereby, the table creation unit 128 creates a graph associating the input tone value IN with the output tone value OUT as illustrated in (b) of FIG. 12, i.e., the γ table as the TRC for correcting the tone value. The table creation unit 128 then transmits the created γ table to the image processing unit 11.

In the initial execution of the above-described calibration process by the calibration unit 12, the colorimetric value and the new target may be stored in a memory such as the auxiliary storage device 505 to be referred to later when an image in the same color tone is output by the user, for example.

The above-described calibration process uses the L*a*b* value instead of the density, and thus is applicable to a color other than the regular process colors CMYK, such as orange or green, i.e., a color for which the density corresponding to the tone value is not defined.

As described above, in the information processing apparatus 10 of the present embodiment, the first acquisition unit 121 acquires the colorimetric value for each of the plurality of monochromatic patches on the calibration chart CC printed out by the image forming apparatus 30 and read by the colorimeter 40. The second acquisition unit 122 acquires the maximum tone value previously set in accordance with the sheet. The conversion unit 123 converts each of the colorimetric value, the maximum tone value, and the color system value of the original target E(x) into the L*a*b* distance. The color system value of the original target E(x) represents the ideal characteristic of the color system value corresponding to the tone value. The target determination unit 127 determines, as the new target, the target F(x) or G(x) passing through the point determined by the L*a*b* distance corresponding to the maximum tone value, i.e., the target generated based on the color system value of the original target E(x) converted into the L*a*b* distance. Thereby, the new target is generated with the maximum tone value determined in accordance with the sheet. Consequently, the responsiveness to various types of sheets with different print characteristics is improved while the tone reproducibility (i.e., gradation) is ensured.

Further, in the information processing apparatus 10, based on the color system value of the original target E(x) converted into the L*a*b* distance, the first target generation unit 124 generates the working target F'(x) passing through the point determined by the L*a*b* value corresponding to the maximum tone value. The determination unit 125 determines whether the working target F'(x) meets the first condition (i.e., the working target F'(x) includes a portion following the original target E(x)) and the second condition (i.e., a portion of the working target F'(x) other than the portion following the original target E(x) is gradational). If the determination unit 125 determines that the working target F'(x) meets both the first condition and the second condition, the target determination unit 127 determines the working target F'(x) as the new target F(x). Thereby, the new target F(x) is generated to follow the original target E(x) as much as possible. Consequently, the gradation in the highlight area is ensured with an appropriate original target.

The program executed in the information processing apparatus 10 or the host computer 20 of the present embodiment may be provided as previously stored in a ROM, for example.

Alternatively, the program executed in the information processing apparatus 10 or the host computer 20 of the present embodiment may be provided as a computer program product recorded on a computer readable recording medium, such as a CD-ROM, a flexible disk (FD), a CD-R, or a DVD, in an installable or executable file format.

Further, the program executed in the information processing apparatus 10 or the host computer 20 of the present embodiment may be stored in a computer connected to a network such as the Internet and be downloaded via the network to be provided, or may be provided or distributed via a network such as the Internet.

The program executed in the information processing apparatus 10 or the host computer 20 of the present embodiment is configured as modules including the above-described functional units. As an actual hardware configuration, a CPU (i.e., a processor) reads and executes the program from a ROM, and thereby the above-described functional units are loaded and generated on a main storage device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image processing apparatus comprising circuitry configured to
    acquire a colorimetric value for each of a plurality of patches on a first chart printed by an image forming apparatus and read by a colorimeter, each of the plurality of patches having a monochromatic color,
    acquire a maximum tone value set in accordance with a sheet,
    convert each of the colorimetric value, the maximum tone value, and a color system value of a first target into a particular color value, the first target representing an ideal characteristic of the color system value corresponding to a tone value, and
    determine, as a second target, a characteristic passing through a point determined by a color value corresponding to the maximum tone value, the characteristic being generated based on the color system value of the first target converted into the particular color value.

2. The image processing apparatus of claim 1, wherein the circuitry is further configured to create correction information based on the second target and a color value corresponding to the colorimetric value, the correction information for correcting a first tone value of image data to be printed by the image forming apparatus into a second tone value.

3. The image processing apparatus of claim 1, wherein the circuitry is further configured to
    generate a third target based on the color system value of the first target converted into the particular color value, the third target being a working target passing through the point determined by the color value corresponding to the maximum tone value, determine whether the third target meets both a first condition and a second condition, the first condition being that the third target includes a following portion following the first target, and the second condition being that a portion of the third target other than the following portion is gradational, and determine the third target as the second target based on a determination that the third target meets both the first condition and the second condition.

4. The image processing apparatus of claim 3, wherein based on a determination that the third target fails to meet both the first condition and the second condition, the circuitry is configured to generate a fourth target represented by a ratio of a first color value to a second color value, the first color value corresponding to a tone value in a portion of the third target near a tone value of zero, and the second color value corresponding to the maximum tone value in the portion of the third target near the tone value of zero, and determine the generated fourth target as the second target.

5. The image processing apparatus of claim 2, wherein the maximum tone value acquired by the circuitry is input from an input device based on a second chart printed out by the image forming apparatus.

6. The image processing apparatus of claim 1, wherein the monochromatic color is at least one of a process color or a color other than the process color.

7. The image processing apparatus of claim 2, wherein in the circuitry is configured to create the correction information by determining the first tone value as a tone value corresponding to the colorimetric value, and determining the second tone value as a tone value corresponding to a color value of a tone characteristic that associates a color value corresponding to the colorimetric value with the tone value corresponding to the colorimetric value, the color value of the tone characteristic being equal to a color value corresponding to the first tone value in the second target.

8. The image processing apparatus of claim 1, wherein the particular color value represents a distance of a set of L*a*b* values of a corresponding one of the colorimetric value, the maximum tone value, and the color system value of the first target from a set of L*a*b* values of a white color of the sheet.

9. An image processing system comprising:
the image processing apparatus of claim 1;
a colorimeter configured to read the first chart; and
an image forming apparatus configured to use correction information created by the image processing apparatus with the second target.

10. An image processing method comprising:
acquiring a colorimetric value for each of a plurality of patches on a first chart read by a colorimeter, each of the plurality of patches having a monochromatic color;
acquiring a maximum tone value set in accordance with a sheet;
converting each of the colorimetric value, the maximum tone value, and a color system value of a first target into a particular color value, the first target representing an ideal characteristic of the color system value corresponding to a tone value; and
determining, as a second target, a characteristic passing through a point determined by a color value corresponding to the maximum tone value, the characteristic being generated based on the color system value of the first target converted into the particular color value.

11. A non-transitory recording medium which, when executed by one or more processors, cause the processors to perform an image processing method comprising:
acquiring a colorimetric value for each of a plurality of patches on a first chart read by a colorimeter, each of the plurality of patches having a monochromatic color;
acquiring a maximum tone value set in accordance with a sheet;
converting each of the colorimetric value, the maximum tone value, and a color system value of a first target into a particular color value, the first target representing an ideal characteristic of the color system value corresponding to a tone value; and
determining, as a second target, a characteristic passing through a point determined by a color value corresponding to the maximum tone value, the characteristic being generated based on the color system value of the first target converted into the particular color value.

12. The non-transitory recording medium of claim 11, the method further comprising:
generating a third target based on the color system value of the first target converted into the particular color value, the third target being a working target passing through the point determined by the color value corresponding to the maximum tone value;
determining whether the third target meets both a first condition and a second condition, the first condition being that the third target includes a following portion following the first target, and the second condition being that a portion of the third target other than the following portion is gradational; and
determining the third target as the second target based on a determination that the third target meets both the first condition and the second condition.

13. The non-transitory recording medium of claim 11, further comprising:
creating correction information based on the second target and a color value corresponding to the colorimetric value by
determining a first tone value as a tone value corresponding to the colorimetric value, and
determining a second tone value as a tone value corresponding to a color value of a tone characteristic that associates a color value corresponding to the colorimetric value with the tone value corresponding to the colorimetric value,
the color value of the tone characteristic being equal to a color value corresponding to the first tone value in the second target,
wherein the correction information is for correcting the first tone value of image data to be printed into the second tone value.

14. The non-transitory recording medium of claim 11, wherein the particular color value represents a distance of a set of L*a*b* values of a corresponding one of the colorimetric value, the maximum tone value, and the color system value of the first target from a set of L*a*b* values of a white color of the sheet.

15. The method of claim 10, further comprising:
generating a third target based on the color system value of the first target converted into the particular color value, the third target being a working target passing through the point determined by the color value corresponding to the maximum tone value;

determining whether the third target meets both a first condition and a second condition, the first condition being that the third target includes a following portion following the first target, and the second condition being that a portion of the third target other than the following portion is gradational; and determining the third target as the second target based on a determination that the third target meets both the first condition and the second condition.

16. The method of claim 10, further comprising:
creating correction information based on the second target and a color value corresponding to the colorimetric value by
determining a first tone value as a tone value corresponding to the colorimetric value, and
determining a second tone value as a tone value corresponding to a color value of a tone characteristic that associates a color value corresponding to the colorimetric value with the tone value corresponding to the colorimetric value,
the color value of the tone characteristic being equal to a color value corresponding to the first tone value in the second target,
wherein the correction information is for correcting the first tone value of image data to be printed into the second tone value.

17. The method of claim 10 wherein the particular color value represents a distance of a set of L*a*b* values of a corresponding one of the colorimetric value, the maximum tone value, and the color system value of the first target from a set of L*a*b* values of a white color of the sheet.

* * * * *